United States Patent
Matheson et al.

(10) Patent No.: US 11,516,969 B2
(45) Date of Patent: *Dec. 6, 2022

(54) HAY BALE FEEDER

(71) Applicants: Tanner Matheson, Kremmling, CO (US); Bill Matheson, Kremmling, CO (US)

(72) Inventors: Tanner Matheson, Kremmling, CO (US); Bill Matheson, Kremmling, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,687

(22) Filed: May 11, 2020

(65) Prior Publication Data

US 2020/0267904 A1    Aug. 27, 2020

Related U.S. Application Data

(63) Continuation of application No. 15/596,215, filed on May 16, 2017, now Pat. No. 10,681,870.

(Continued)

(51) Int. Cl.
*A01D 87/12*    (2006.01)
*A01D 87/00*    (2006.01)
(Continued)

(52) U.S. Cl.
CPC ....... *A01D 87/122* (2013.01); *A01D 87/0007* (2013.01); *A01F 29/005* (2013.01); *A01F 29/01* (2013.01); *A01F 29/02* (2013.01)

(58) Field of Classification Search
CPC . A01D 87/122; A01D 87/0007; A01F 29/005; A01F 29/01; A01F 29/02;
(Continued)

(56) References Cited

U.S. PATENT DOCUMENTS 3,915,392 A * 10/1975 Kugler .................. B02C 18/145
                                                        241/74
5,242,121 A *  9/1993 Neier ................... A01D 87/127
                                                       241/101.76
(Continued)

FOREIGN PATENT DOCUMENTS

DE    3236862 C2 *  4/1993   ........... A01D 90/105
EP    0223004 A1 *  5/1987   ........... A01F 29/005
FR    2741507 A1 *  5/1997   ........... A01F 29/005

OTHER PUBLICATIONS

Collibault, translation of FR-2741507-A1 (Year: 1997).*
Ansink, Translation of EP-0223004-A1 (Year: 1987).*
Weichel, Translation of DE-3236862-C2 (Year: 1993).*

*Primary Examiner* — Adam J Eiseman
*Assistant Examiner* — Bobby Yeonjin Kim
(74) *Attorney, Agent, or Firm* — Leyendecker & Lemire, LLC (57) ABSTRACT

A hay bale feeder is described. Embodiments of the hay bale feeder include a frame, one or more bale support members, and a pair of spaced apart drum assemblies. The hay bale feeder can be implemented to shred a square hay bale. The hay bale feeder can typically be attached to a tractor or other vehicle. The pair of spaced apart drum assemblies can include a pair of drums having protrusions that are adapted to shred a square hay bale as the square hay bale is gravity fed to the pair of drum assemblies.

14 Claims, 9 Drawing Sheets

Related U.S. Application Data

(60) Provisional application No. 62/337,250, filed on May 16, 2016.

(51) Int. Cl.
*A01F 29/01* (2006.01)
*A01F 29/02* (2006.01)
*A01F 29/00* (2006.01)

(58) Field of Classification Search
CPC ......... B02C 4/30; B02C 4/305; B65B 63/026; B65G 11/106; B65G 13/12; B65G 11/186; B65G 21/10
USPC ............ 241/600, 101.76, 291, 293; 198/817, 198/861.1
See application file for complete search history.

(56) References Cited

U.S. PATENT DOCUMENTS

| | | | |
|---|---|---|---|
| 2002/0053614 A1* | 5/2002 | Grellner | A01F 29/005 241/30 |
| 2008/0063503 A1* | 3/2008 | Garrett | A01D 87/127 414/729 |
| 2010/0219275 A1* | 9/2010 | Weiss | A01K 5/005 241/101.76 |
| 2011/0192924 A1* | 8/2011 | Kisenwether | A01F 29/005 241/101.77 |
| 2014/0209713 A1* | 7/2014 | Simon | B02C 21/02 241/101.76 |

* cited by examiner

HAY BALE FEEDER

CROSS-REFERENCE TO RELATED APPLICATION

This application claims the benefit of U.S. Provisional Application No. 62/337,250, filed May 16, 2016.

This application is a continuation of U.S. application Ser. No. 15/596,215, filed May 16, 2017.

BACKGROUND

Hay is often used by ranchers to feed cattle and other livestock when grass is not available in sufficient quantity for grazing. Hay is used especially during winter months when the ground is covered with snow. Hay is most typically stored in bales. Hay bales can have a variety of configurations including round and square. Round bales comprise a rolled sheet of hay, whereas square bales comprise rectangular cuboids of compressed hay. Large square hay bales can weigh as much as a ton or more.

Feeding livestock from hay bales requires a rancher to break up or disperse the compacted hay so that the livestock can efficiently graze upon it. Round bales can be unwound and the unwound compacted layer is shredded with relative ease as several mechanized solutions exist to efficiently accomplish this. Unfortunately, large square bales have not proven as easy to break apart and distribute on the ground. Traditionally, the large square bale is pulled on a trailer behind a tractor and a ranch hand manually breaks the bale apart using a pitch fork. This is often undesirable as two people are required at a minimum to distribute a square bale.

Mechanized solutions to break apart a large square bale are known but they suffer from a variety of problems. Some do not effectively break the bale into small enough pieces. Other bale feeders are very expensive making them cost prohibitive. Some require additional machinery to lift and place the bale on the feeder.

A device for shredding large square hay bales that is cost effective, universally attachable to three-point hitch tractors, easily loadable with hay bales, and configurable for differently sized square bales is needed.

DETAILED DESCRIPTION

Embodiments of the present invention include a hay bale feeder for use with square hay bales and large square hay bales. The hay bale feeder can be implemented to transport and simultaneously distribute hay for feed when operatively coupled to a tractor. Typically, the hay bale feeder can be operatively coupled to a three point hitch of a tractor. Operationally, when used in combination with the tractor, the feeder can be implemented to pick up a square bale, shred the bale, and distribute the shredded hay along the ground for easy access by livestock.

In one embodiment, the feeder can include, but is not limited to, a frame that comprises a pair of spaced apart parallel bale support arms on which a bale slides and can be supported as the bale may be shredded. The feeder can further include a pair of spaced apart counter-rotating shredder drum assemblies. The shredder drum assemblies can be provided at a front of the feeder for shredding a portion of the hay bale in direct contact with studs that radially protrude from the drums. The frame can extend beyond the shredder drum assemblies by a mounting framework. The mounting framework can be pivotably coupled to corresponding arms of the three point hitch on the tractor that can permit the feeder to pivot upwardly and downwardly therefrom. A hydraulic linear actuator can extend between the tractor and a top of the frame. By retracting and extending the actuator, the frame can be moved and/or rotated upwardly and downwardly about the pivoted connection to the tractor.

In a fully lowered position, the bale support arms can rest on the ground and the linear actuator can be in a maximum extended position. In the lowered position, distal ends of the support arms can at least rest on the ground. Once a bale and the support arms of the feeder have been aligned, the bale can be slid onto the support arms by driving the tractor towards the bale. Once the bale has been loaded onto the support arms, the hydraulic actuator can be activated such that the frame and the associated support arms can be rotated upwardly causing the bale to slide towards the shredder drums. In one instance, the support arms can rotate approximately 35-40 degrees from parallel with the ground. As can be appreciated, the support arms can be rotated further as the hay bale becomes smaller.

As a front end of the bale comes in contact with the shredder drums, the drums can be adapted to rip apart the bale and eject the hay towards the ground. As necessary, the hydraulic actuator can be manipulated to change an angle of the bale relative to the ground. As can be appreciated, by fully retracting the actuator the bale can be positioned at a greater angle relative to ground using gravity to cause the bale to slide into the shredder drums with greater force. In contrast, at a lower angle the relative force provided by gravity to urge the bale into the shredders may be less. By manipulating a position of the actuator, and consequently the bale, an operator can control a rate and aggressiveness of the shredding process.

When the bale is first loaded onto the feeder, the angle of the frame and the bale relative to ground may be lower as the weight of the full bale when acted upon by gravity at a lower angle may be sufficient to provide enough force against the shredder drums to shred or break up the bale at a desired rate causing the feeder to eject clumps of hay of a desired size. As the bale becomes smaller, and consequently weighs less, the angle may need to be increased to maintain sufficient force against the shredder drums.

Typically, farm tractors include a hydraulic pumping system and ports to which hoses of hydraulic implements on a tractor attachment can be attached to the tractor for control and operation from cab of the tractor. As can be appreciated, motors turning the shredder drums and the actuator can all be hydraulically powered and controlled. In variations, feeders using electric or pneumatic motors and/or actuators are contemplated.

Each of the drum assemblies can include a series of studs or protrusions extending radially from the drums. The studs can be arranged in a particular pattern designed to more effectively rip and dislodge chunks of hay from a bale. Other arrangements of the studs are contemplated as are using different quantities of studs of potentially differing lengths. It is further appreciated that a diameter of the drums can vary. The shredding drums may be configured to help pull the bale towards them. As previously mentioned, the drums can be configured to counter-rotate, thereby pulling the bale in between the drums. As can be appreciated, variations of the drums may rotate in the same direction or a direction of rotation of the drums could be switched by an operator to facilitate more effective shredding of the bale as necessary.

In one embodiment, the support arms can interface with the frame at a rear end of the feeder and couple to a support plate spanning between the support arms proximate where a bottom end of the bale rests just prior to being fed into the shredder drums.

One example embodiment of the hay bale feeder can comprise a feeder configured for pivotal attachment to a three point hitch of a tractor including an actuator (e.g. a cylinder) for pivoting the feeder relative to the tractor. The feeder can include one or more support arms that can be slid under a square bale of hay. The feeder can further include one or more shredder drums to break apart the hay bale when an end of the bale is fed against the one or more shredder drums. The feeder can be configured to utilize gravity to assist in moving the bale into the one or more shredder drums.

Another example embodiment can comprise the previously described hay feeder in combination with a tractor.

Yet another example embodiment can comprise a method of picking up a square bale of hay and feeding the hay into the one or more shredding drums as previously described.

Another example embodiment can comprise a method of breaking apart a hay bale using the previously described feeder and tractor combination.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Hay Bale Feeder

Figure 1:
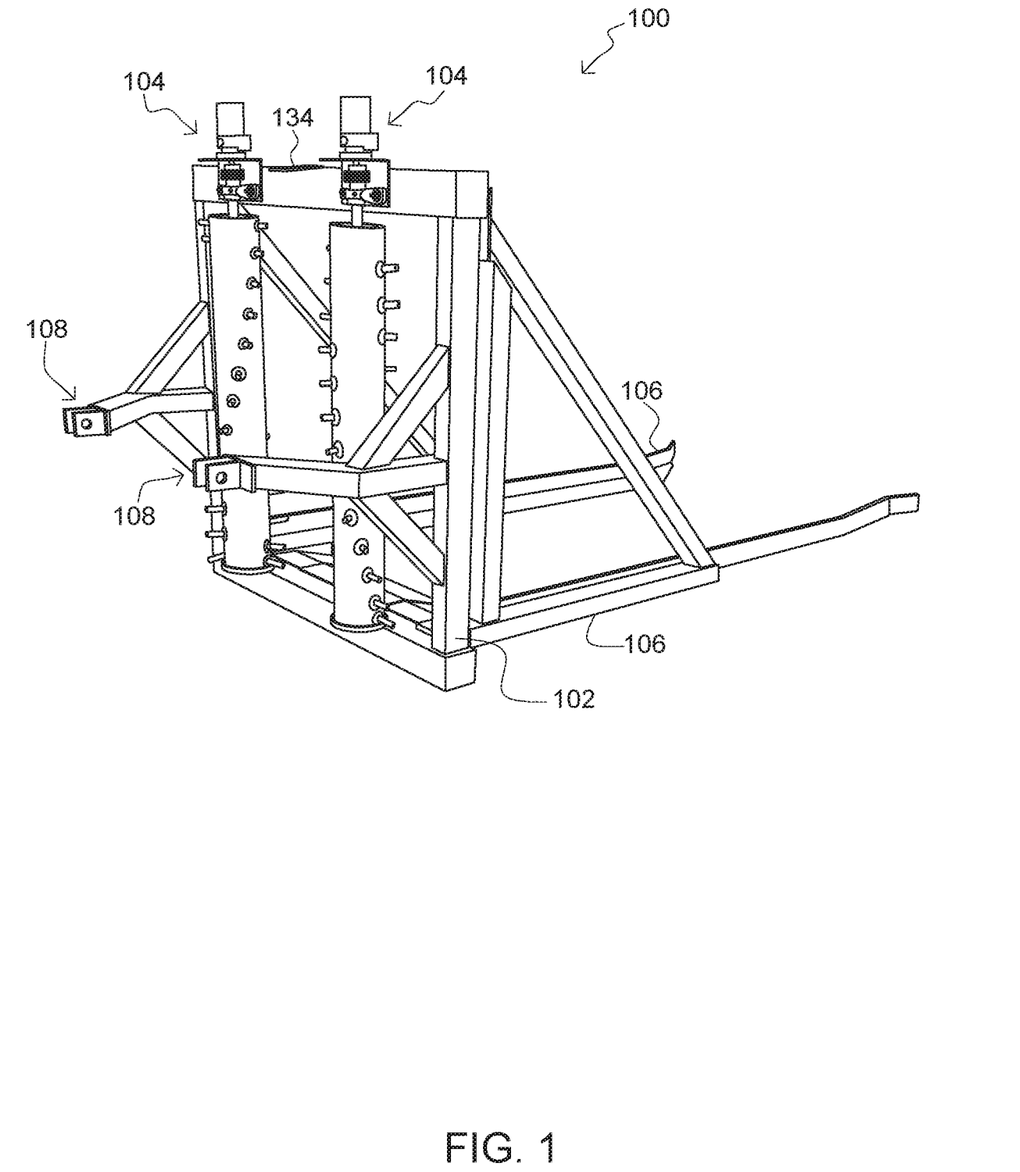
FIG. 1 is a perspective view of a hay bale feeder according to one embodiment of the present invention.

Referring to FIG. 1, a front perspective view an embodiment 100 of a hay bale feeder is illustrated. The hay bale feeder 100 can be implemented to transport, shred, and distribute square bales of hay. Typically, the hay bale feeder 100 can be operatively coupled to a tractor or other vehicle.

The feeder 100 can include, but is not limited to, a frame 102, a pair of spaced apart drum assemblies 104, a pair of support arms 106, and an attachment framework 108. The pair of spaced apart drum assemblies 104 can be implemented to shred a square hay bale interfacing with the drum assemblies 104. The pair of support arms 106 can be implemented to hold a square bale for shredding. The attachment framework 108 can be implemented to couple the feeder 100 to a three point hitch of a tractor. Typically, the frame 102 can have a substantially rectangular shape. The pair of support arms 106 can extend away from the frame 102 in one direction and the attachment framework 108 can extend away from the frame 102 in an opposite direction.

Figure 2:
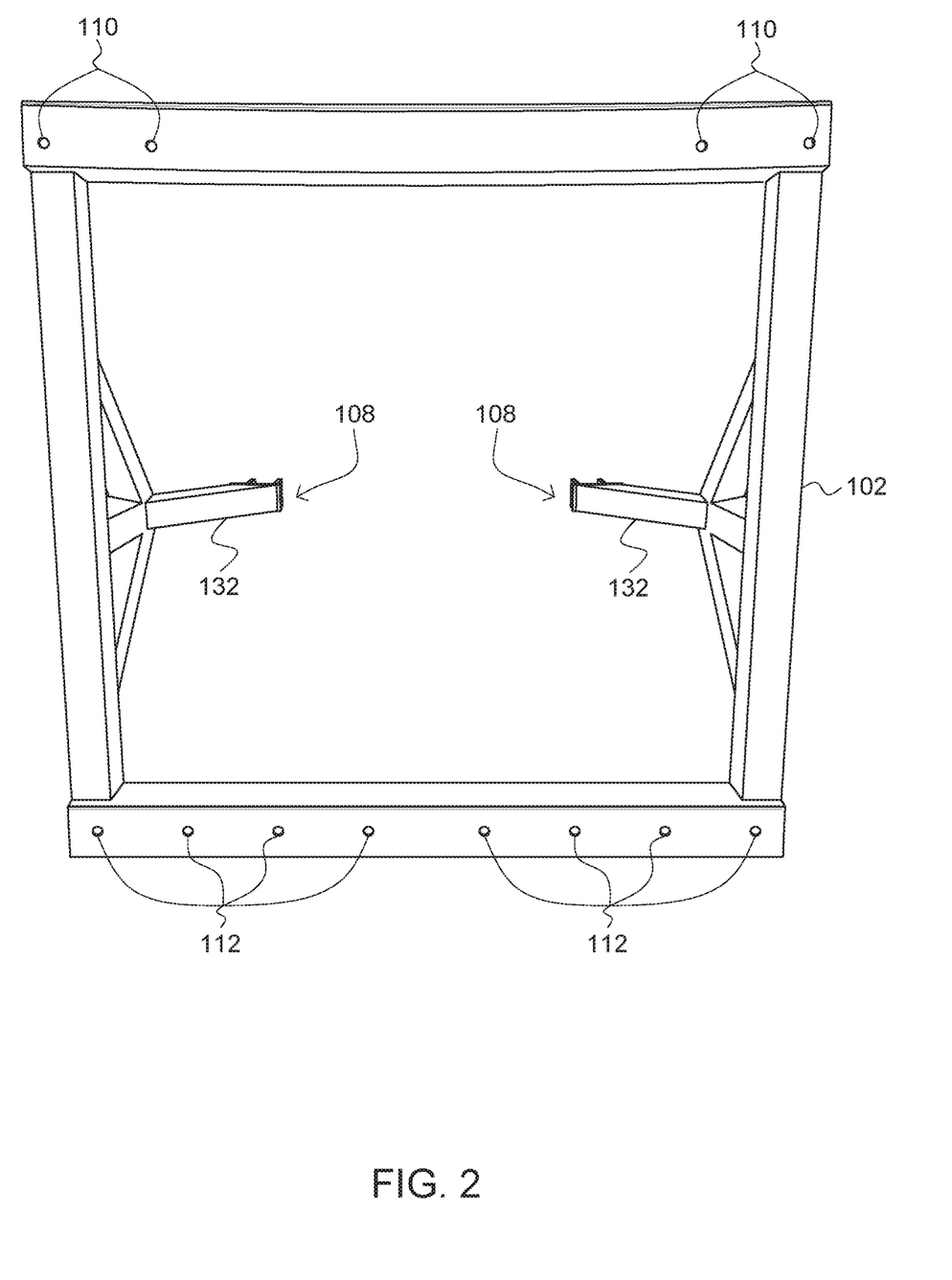
FIG. 2 is a back view of a frame of a hay bale feeder according to one embodiment of the present invention.

Referring to FIG. 2, a back view of the frame 102 is illustrated. As shown, the frame 102 can include a first set of holes 110 located on a top frame member and a second set of holes 112 located on a bottom frame member of the frame 102. The first set of holes 110 and the second set of holes 112 can each be configured to receive a bolt for adjustably coupling the pair of support arms 106 to the frame 102. In one embodiment, the frame 102 can be manufactured from rigid tubes. For example, steel tubes having a substantially rectangular cross-section can be implemented to form the frame. As shown in FIG. 2, one example of the frame 102 can have a substantially rectangular shape with a top frame member, a bottom frame member, and a pair of side frame members.

Figure 3:
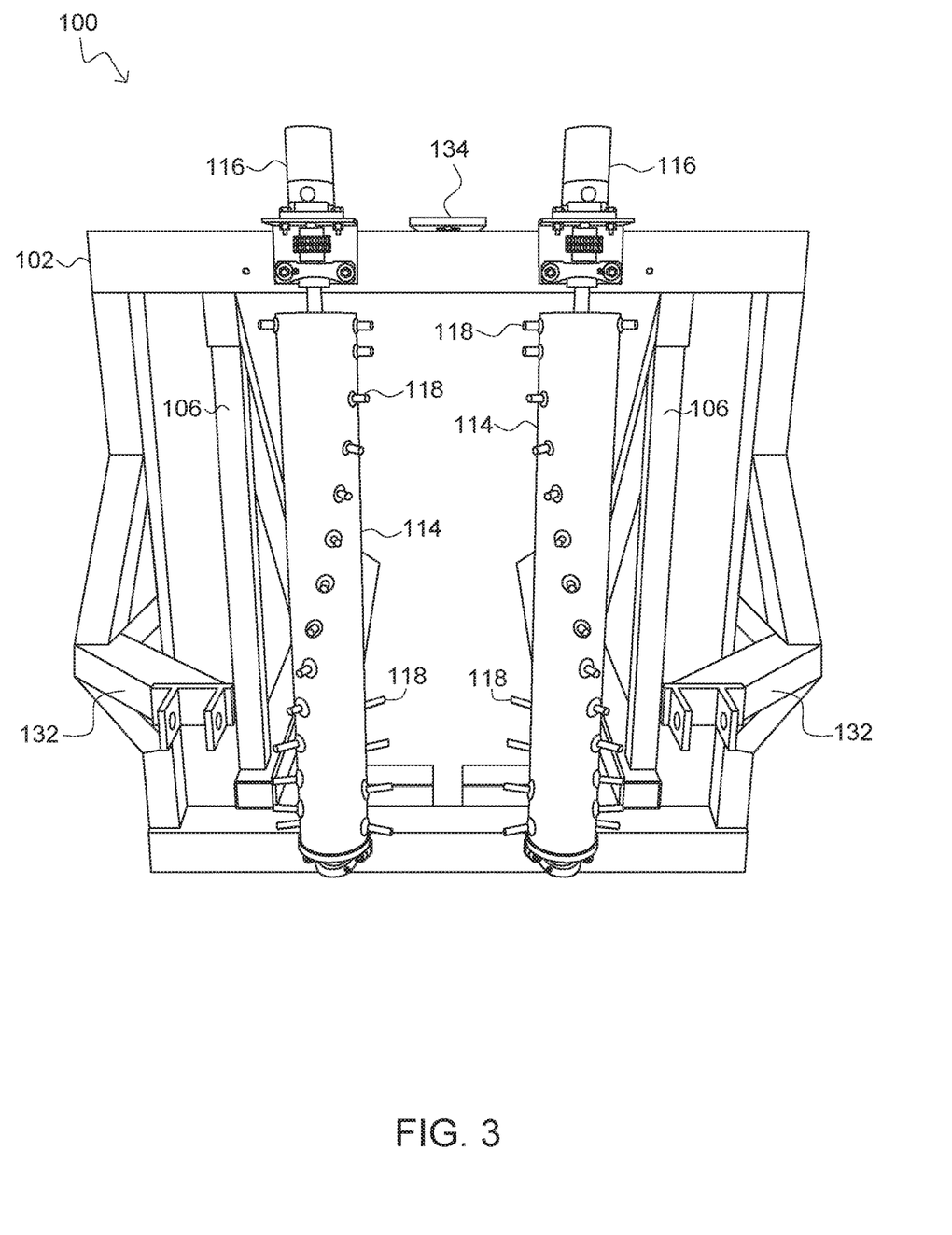
FIG. 3 is a front view of a hay bale feeder according to one embodiment of the present invention.

Referring to FIG. 3, a front view of the feeder 100 is illustrated. As shown, the pair of spaced apart drum assemblies 104 can be coupled to the frame 102 with each of the drum assemblies 104 spaced equidistantly from an approximate middle of the frame 102. In some embodiments, the drum assemblies 104 can be movably coupled to the frame 102. For instance, a distance between the drum assemblies 104 can be lengthened or shortened. In one example, the frame 102 can include a plurality of holes for receiving a fastener to couple the drum assemblies 104 to the frame 102. Embodiments are contemplated where the drum assemblies 104 are slidably coupled to the frame 102. Typically, the pair of drum assemblies 104 can each include, but are not limited to, a drum 114, a motor 116, and a plurality of protrusions 118. The motors 116 can be implemented to rotate the drums 114. For instance, the motors 116 can be operatively coupled to the drums 114. Typically, the drums 114 can be rotated in opposite directions to pull a square hay bale towards and through a space between the pair of drums 114. In one embodiment, the motors 116 can be hydraulic motors adapted to rotate the drums 114 at variable speeds. In a typical implementation, the motors 116 can be high torque, low RPM motors. The motors 116 can include hydraulic cables (or hoses) 117 (shown in FIGS. 6A-6C) to operatively couple to hydraulic cable connectors of a tractor. In a typical implementation, an operator can control a rate of rotation of the drums 114 by controlling rotations-per-minute (RPMs) of the motors 116. As can be appreciated, the tractor may include a lever or some other control means for operatively controlling a pressure of one or more hydraulic systems of the tractor.

Embodiments are contemplated where a single motor is implemented to rotate each of the drums. In one embodiment, a single drum assembly can be implemented in a vertical orientation. In another embodiment, a single drum assembly can be implemented in a horizontal orientation. In such an embodiment, a square hay bale can be configured to pass between the single drum assembly and a rigid member spaced apart from the drum assembly. For instance, a side of the frame can be implemented as the rigid member when the drum assembly is in a vertical orientation. In another instance, a bottom of the frame can be implemented as the rigid member when the drum assembly is in the horizontal orientation.

As shown, the plurality of protrusions 118 can radially protrude from the drums 114. In one instance, the plurality of protrusions 118 can be helically coupled to the drums 114. In another instance, the plurality of protrusions 118 can form a double helix around the drum 114. In some embodiments, the plurality of protrusions 118 can have differing lengths extending out from the drums 114. For example, protrusions 118 located approximate a bottom half of the drum 114 can have a first length and protrusions 118 located approximate a top half of the drum can have a second length. In one instance, the first length can be larger than the second length. In another instance, the second length can be larger than the first length. In one example, the first length can be approximately 2½ inches and the second length can be approximately 1½ inches. Of note, spacing between the plurality of protrusions 118 can be altered without exceeding a scope of the present invention.

Figure 4A:
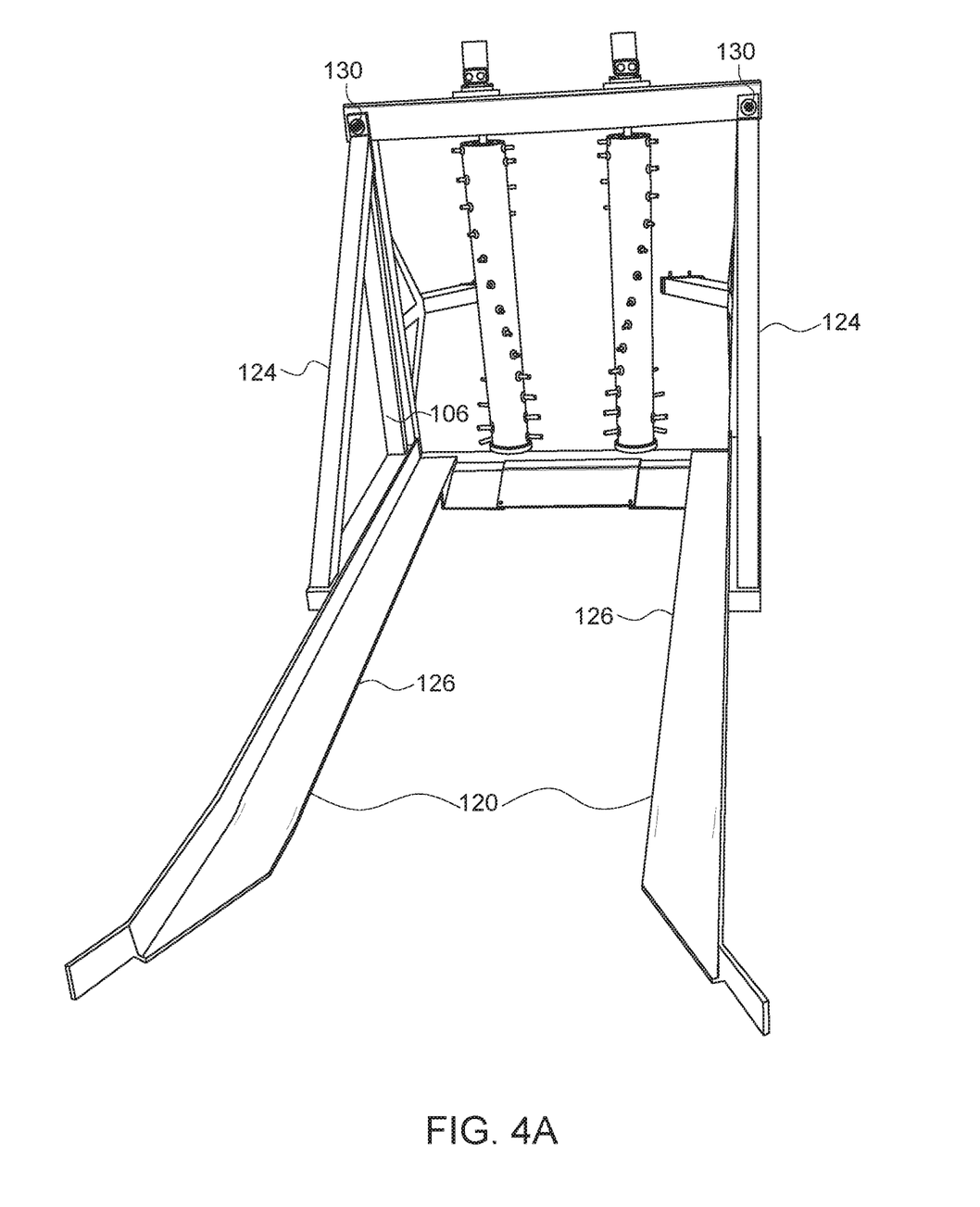
FIG. 4A is back perspective view of a hay bale feeder according to one embodiment of the present invention
Figure 4B:
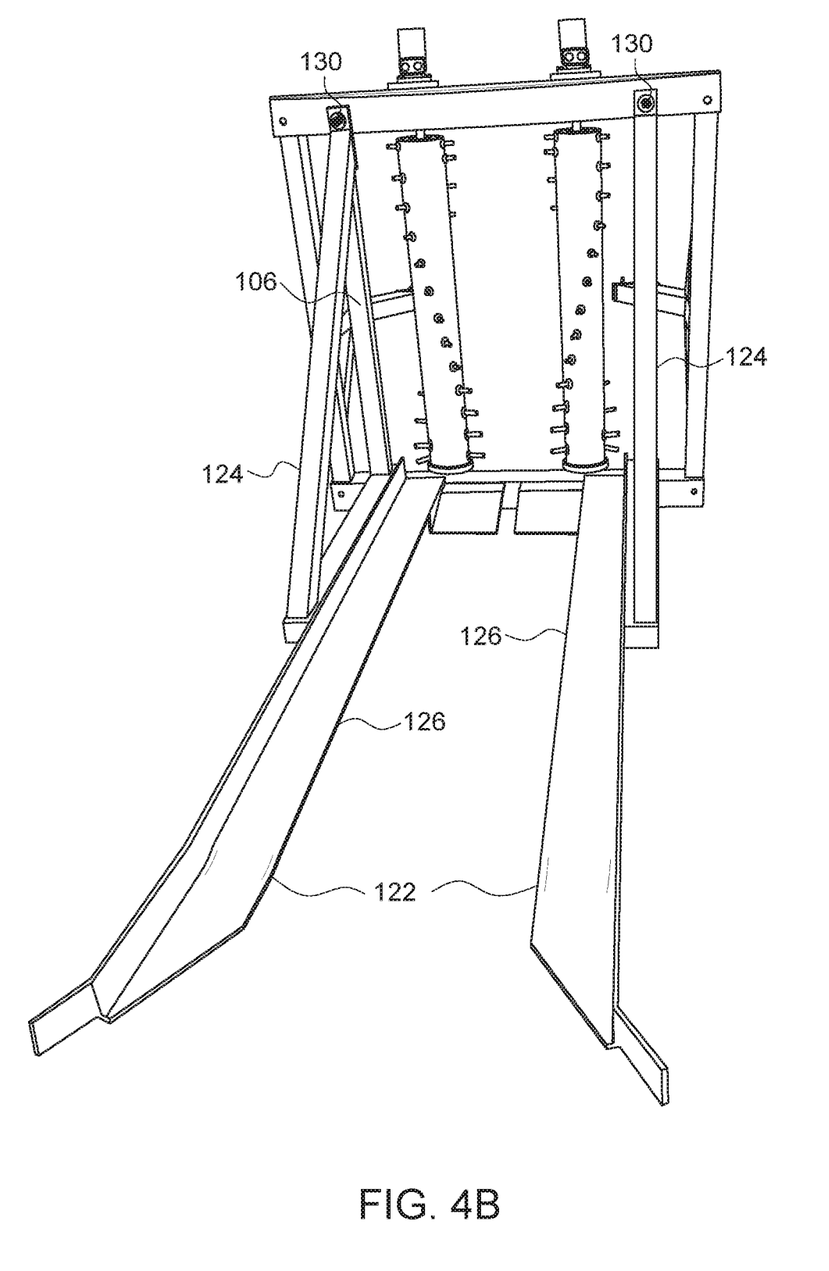
FIG. 4B is a back perspective view of a hay bale feeder according to one embodiment of the present invention.

Referring to FIGS. 4A-4B, back views of the feeder 100 with the pair of support arms 106 in a first position 120 and a second position 122, respectively, are illustrated. In one embodiment, the pair of support arms 106 can removably couple to the frame 102 to move between the first position 120 and the second position 122. In some embodiments, the pair of the support arms 106 can be coupled to the frame 102 in either the first position 120 or the second position 122.

As shown in FIG. 4A, when the pair of the support arms 106 are in a first position 120, the pair of support arms 106 can be approximate opposite ends of the frame 102. Typically, when the pair of support arms 106 are in the first position 120, the hay bale feeder 100 can be implemented to shred large square bales of hay. In one instance, the pair of support arms 106 can be separated approximately 4 feet. For example, square hay bales having a width of 4 feet can be supported by the pair of support arms 106 and shredded by the hay bale feeder 100 in the first position 120.

As shown in FIG. 4B, when the pair of support arms 106 are in the second position 122, the pair of support arms 106 can move in towards a middle of the frame 102. Typically, when the pair of support arms 106 are in the second position 120, the hay bale feeder 100 can be implemented to shred smaller sized hay bales. In one instance, the pair of support arms 106 can be separated approximately 3 feet. For example, square hay bales having a width of 3 feet can be supported by the pair of support arms 106 and shredded by the hay bale feeder 100.

Figure 5:
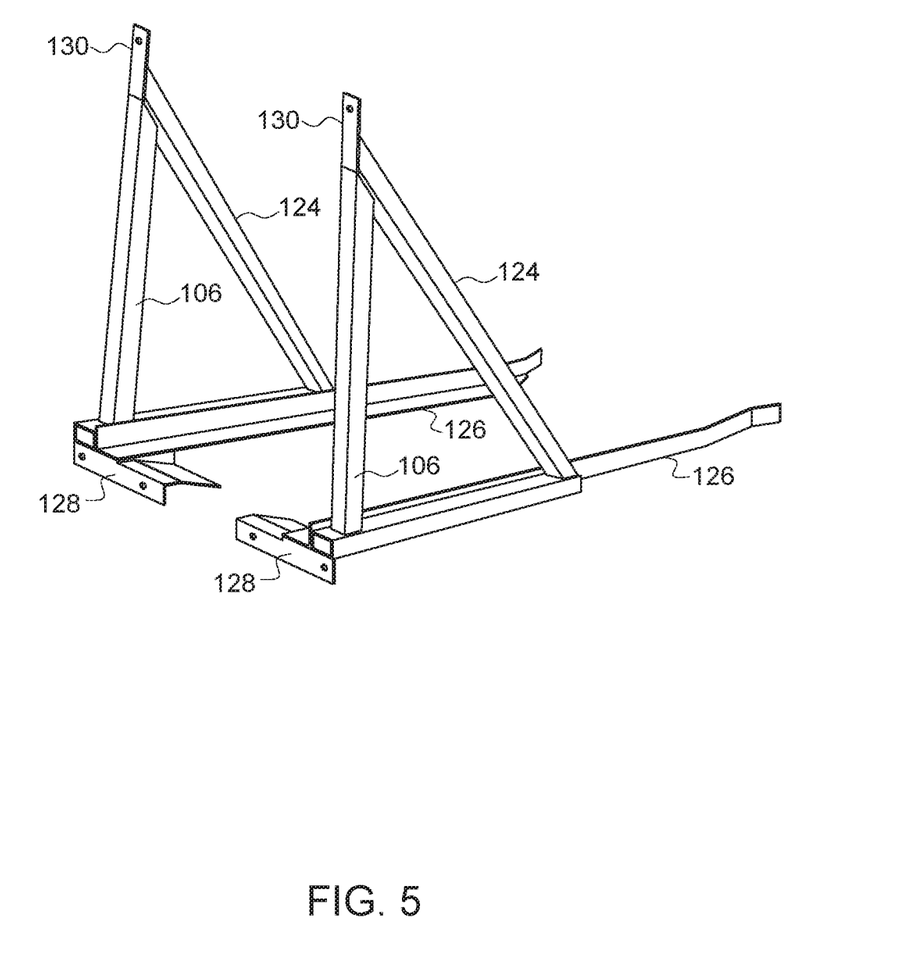
FIG. 5 is a perspective view of a pair of support arms of a hay bale feeder according to one embodiment of the present invention.

Referring generally to FIG. 5, a back perspective view of the pair of support arms 106 is illustrated. As shown, the pair of support arms 106 can each include, but are not limited to, a support framework 124, a bale support member 126, a lower mounting plate 128, and an upper mounting plate 130. Typically, each of the components 126, 128, 130 can be coupled to the support framework 124. In one example, the support framework 124 can have a substantially triangular shape. As can be appreciated, other shapes and configurations are contemplated for the support framework 124 and the provided illustrations are not meant to be limiting.

As shown, the bale support member 126 can extend a significant distance past the end of the support framework 124. Typically, the bale support member can have a substantially "L" cross-section. The lower portion of the bale support member 126 can provide support under a hay bale and the vertical portion of the bale support member 126 can guide the hay bale on a side of a square hay bale. In some embodiments, a distal end of the bale support member 126 can be flared out to form a mouth with the other bale support member 126 for interfacing with and guiding a square hay bale onto the pair of support arms 106.

Embodiments of the present invention are contemplated where the pair of support arms are replaced by one or more bale support members (or plates) coupled to the frame. For instance, a plate can be sized sufficiently to support a square hay bale and be coupled to a lower part of the frame. As can be appreciated, the plate can be slid under a square hay bale and then rotated up towards a tractor. The hay bale can slide down the plate towards the pair of drums to be shred. In another example, a plurality of bale support members can extend out from a bottom of the frame to interface with and support a square hay bale.

Referring back to FIG. 2, the first set of holes 110 located on the frame 102 can be configured to interface with the upper mounting plates 130 of the pair of support arms 106. In one embodiment, a bolt and nut combination can be implemented to couple the upper mounting plate 130 to one of the first set of holes 110. The second set of holes 112 located on the frame 102 can be configured to interface with the lower mounting plates 128 of the pair of support arms 106. In one instance, the lower mounting plates 128 can include at least two holes configured to match up with two holes of the second set of holes 112.

Referring back to FIGS. 1-3, the attachment framework 108 can typically include, but is not limited to, a pair of attachment arms 132 and an attachment plate 134. The pair of attachment arms 132 can be implemented to couple to lower link arms of a three point hitch on a tractor. The attachment plate 134 can be implemented to couple to a top link arm of the three point hitch. As shown, the pair of attachment arms 132 can be located approximate a middle portion of the frame 102 and can taper in as the attachment arms 132 extend further from the frame 102. The attachment plate 134 can typically be located atop a middle of the upper frame member of the frame 102.

Method of Implementing a Hay Bale Feeder

Figure 6A:
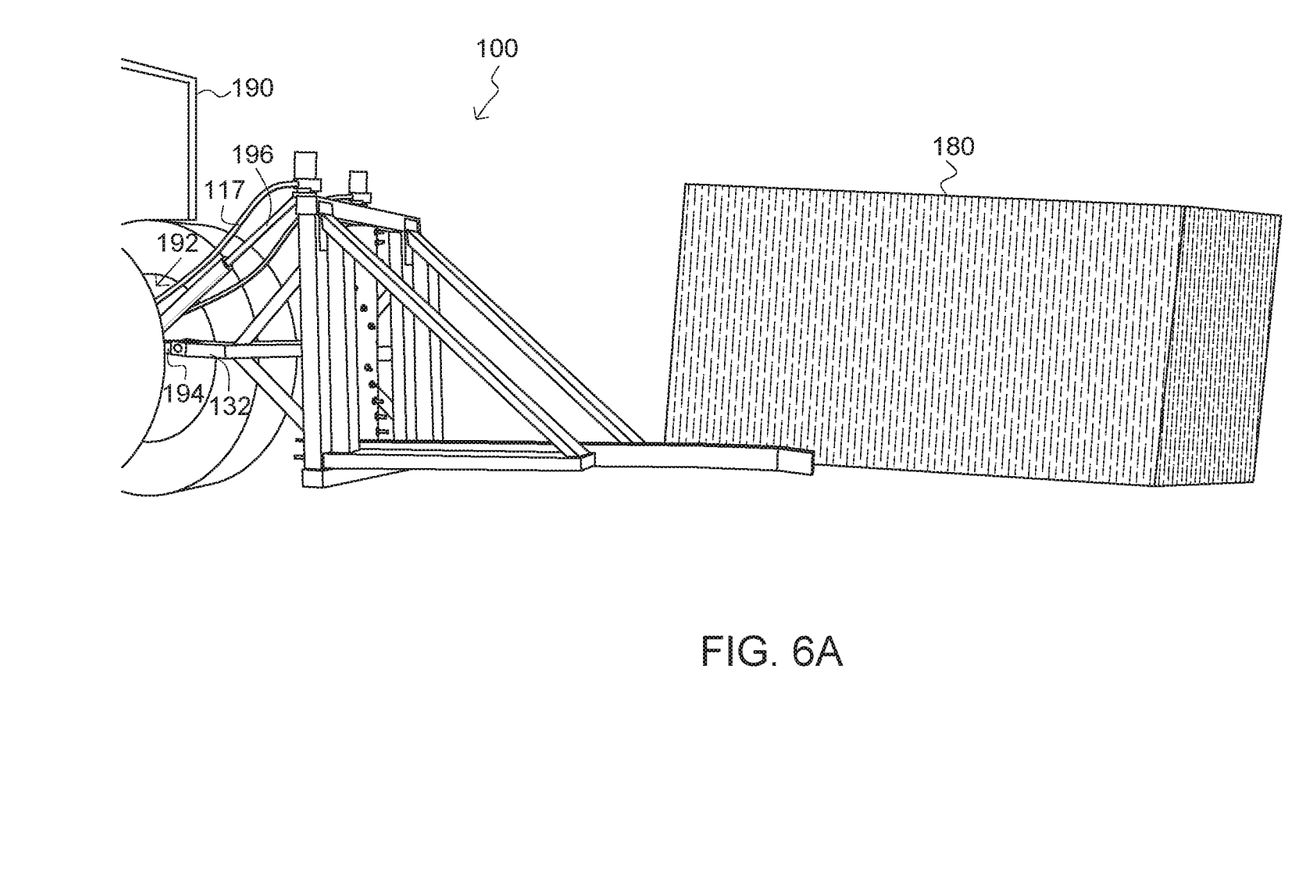
FIGS. 6A-6C include side perspective views of a square hay bale being engaged by a hay bale feeder according to one embodiment of the present invention.
Figure 6B:
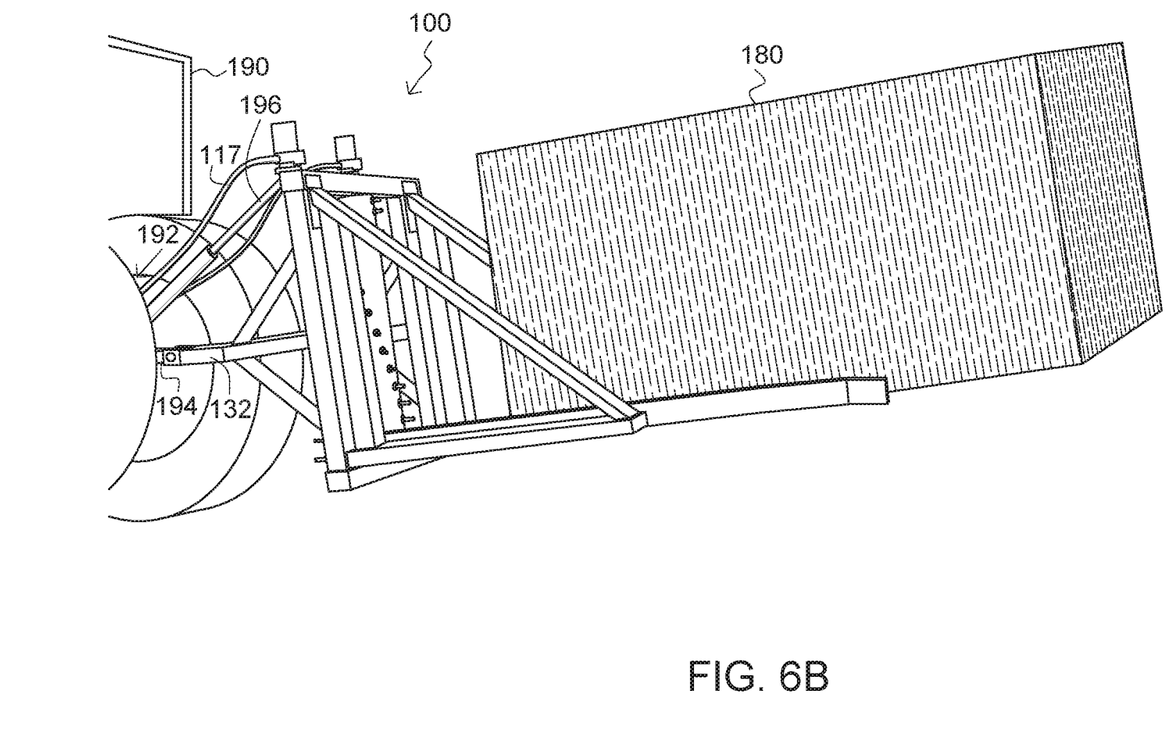
Figure 6C:
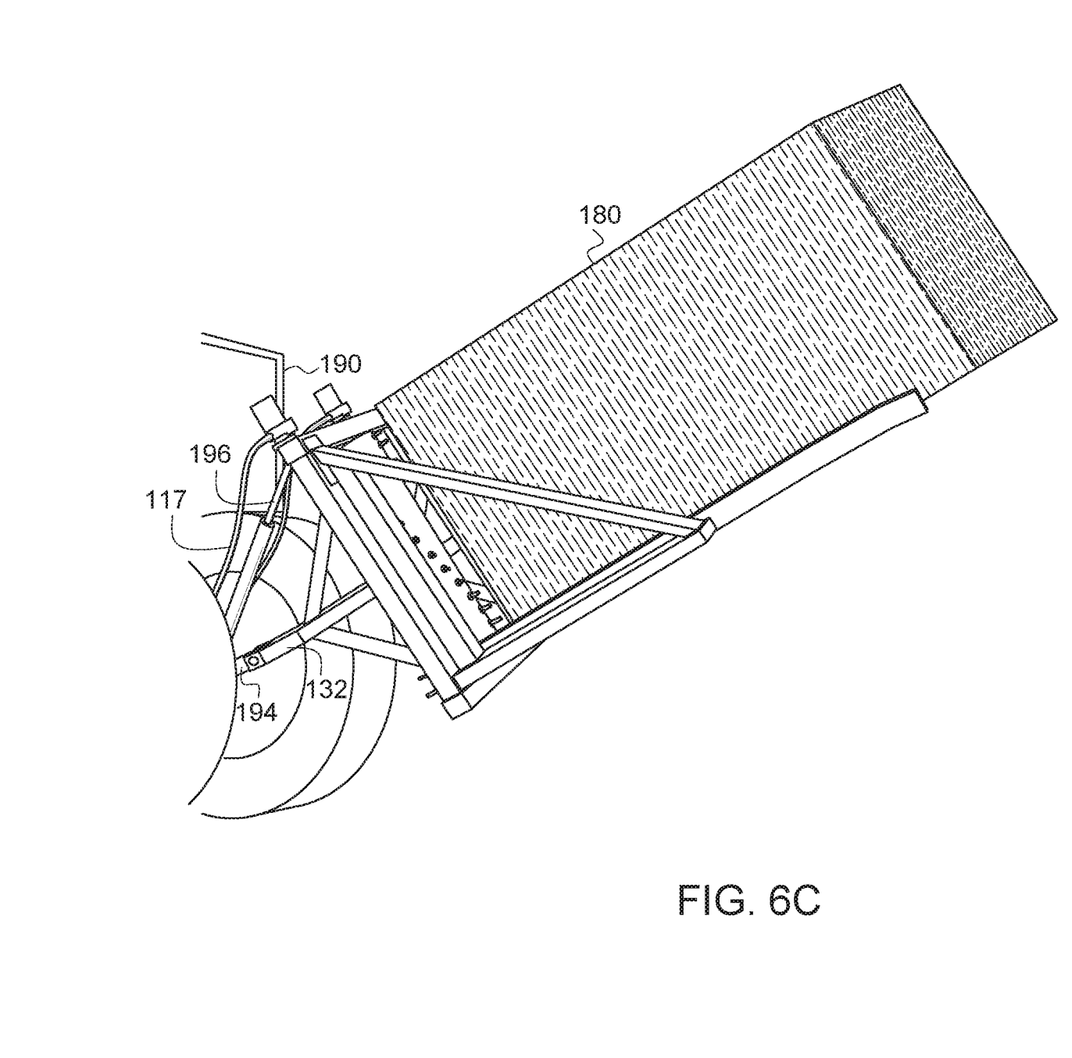

Referring to FIGS. 6A-6C, a method or process for implementing the previously described hay bale feeder 100 is graphically illustrated.

Typically, in a first step the hay bale feeder 100 can be operatively coupled to a tractor 190. The attachment framework 108 of the hay bale feeder 100 can be coupled to a three point hitch 192 of the tractor 190. In one example, the pair of attachment arms 132 can each be pivotably coupled to a lower link arm 194 of the three point hitch 192. The attachment plate 134 can be coupled to a top link arm 196 of the three point hitch 192. In some embodiments, the top link arm 196 can include an actuator for retracting and extending the top link arm 196.

After the hay bale feeder 100 has been operatively coupled to the tractor 190, the pair of support arms 106 of the hay bale feeder 100 can be lowered proximate a surface where a square hay bale 180 can be resting. Next, an operator can move the tractor 190 towards the square hay bale 180 to load the square hay bale 180 onto the hay bale feeder 100 by sliding the one or more support arms 106 under the square hay bale 180.

Next, an operator can rotate the hay bale feeder upwards by actuating the actuator and retracting the top link arm 196 inwards to pivotably rotate the hay bale feeder 100 about the coupling between the lower link arms 194 and the pair of attachment arms 132.

The force of gravity can act upon the square hay bale 180 to move the bale 180 towards the pair of drum assemblies 104. As can be appreciated, gravity can be used to feed the square hay bale 180 to the pair of rotating drums 114 of the hay bale feeder 100. For instance, the operator may control a rate of distribution of the hay by raising and lowering the pair of support arms 106 thus increasing or decreasing an effect gravity has on moving the square hay bale 180.

As the hay bale feeder 100 is shredding the square hay bale 180, the operator can move the tractor to distribute the shredded hay where needed.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A hay bale feeder comprising:
a frame having a substantially square shape, a front of the frame adapted to be located proximate a three point tractor hitch;
a pair of spaced apart drum assemblies fixed to the front of the frame, the pair of spaced apart drum assemblies each including:
a drum being oriented vertically and having a plurality of protrusions; and
a motor adapted to rotate the drum;
a pair of support arms removably coupled to a back of the frame, the pair of support arms adapted to provide support under a square hay bale;
wherein (i) the square hay bale is adapted to be gravity fed to the drums of the pair of spaced apart drum assemblies, (ii) the square hay bale is adapted to be passed between the drums, and (iii) the pair of support arms each include a bale support member having a substantially "L" cross-section and a lower portion of the bale support member is adapted to provide the support under the square hay bale.

2. The hay bale feeder of claim 1, wherein each one of the pair of support arms further include:
a support framework having a substantially triangular shape;
the bale support member being coupled to the support framework;
a lower mounting plate coupled to the support framework; and
an upper mounting plate coupled to the support framework.

3. The hay bale feeder of claim 2, wherein the frame includes (i) a first set of holes located on a top frame member of the frame, and (ii) a second set of holes located on a bottom frame member of the frame.

4. The hay bale feeder of claim 3, wherein the lower mounting plates are configured to couple to the frame proximate the bottom frame member.

5. The hay bale feeder of claim 3, wherein the upper mounting plates are configured to couple to the frame proximate the upper frame member.

6. The hay bale feeder of claim 3, wherein the first set of holes and the second set of holes are each configured to receive a bolt therethrough for removably coupling the pair of support arms to the frame.

7. A hay bale feeder comprising:
a frame, a front of the frame adapted to be located proximate a three point tractor hitch;
a pair of spaced apart drum assemblies fixed to the frame, the pair of spaced apart drum assemblies each including:
a drum being oriented vertically and having a plurality of protrusions; and
a motor adapted to rotate the drum;
a pair of support arms removably coupled to the frame, each of the pair of support arms being defined by:
a support framework having a substantially triangular shape; and
a bale support member coupled to the support framework and having a substantially "L" cross-section, a lower portion of the bale support member adapted to provide support under a square hay bale.

8. The hay bale feeder of claim 7, wherein the square hay bale is adapted to be gravity fed to the drums of the pair of spaced apart drum assemblies.

9. The hay bale feeder of claim 8, wherein the square hay bale is adapted to be passed between the drums.

10. A method of distributing a square hay bale, the method comprising:
providing a hay bale feeder, the hay bale feeder including:
a frame, a front of the frame adapted to be located proximate a three point tractor hitch;
a pair of spaced apart drum assemblies fixed to the frame, the pair of spaced apart drum assemblies each including:
a drum having a plurality of protrusions, the drum being oriented vertically; and a motor adapted to rotate the drum;
a pair of support arms removably coupled to the frame, each of the pair of support arms being defined by:
  a support framework having a substantially triangular shape; and
  a bale support member coupled to the support framework and having a substantially "L" cross-section, a lower portion of the bale support member adapted to provide support under a square hay bale;
operatively coupling the hay bale feeder to a tractor;
lowering the pair of support arms of the hay bale feeder proximate a surface where a square hay bale is resting;
loading the square hay bale onto the hay bale feeder by moving the tractor towards the square hay bale and sliding at least a portion of the pair of support arms under the square hay bale;
rotating the pair of support arms upwards;
gravity feeding the square hay bale to the pair of spaced apart drum assemblies; and
moving the tractor as the square hay bale is shredded by the pair of spaced apart drum assemblies.

11. The method of claim 10, wherein the shredded hay bale is discarded directly onto the surface.

12. The method of claim 10, the method further including the step of:
controlling a rate and an aggressiveness of shredding by raising or lowering the pair of support arms.

13. The method of claim 10, wherein at least distal ends of the pair of support arms rest on the surface in a lowered position.

14. The method of claim 10, the method further including the step of:
further rotating the support arms up based on a size of the square hay bale.

* * * * *